(No Model.)
S. T. RANDOLPH.
BALL BEARING.
No. 606,241. Patented June 28, 1898.
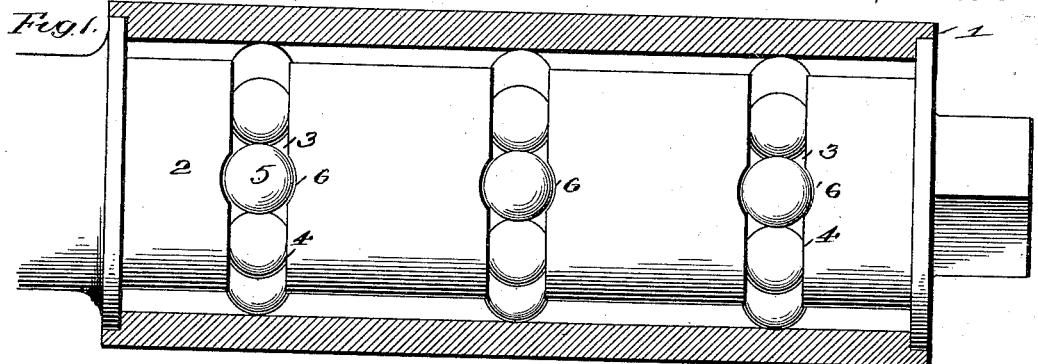
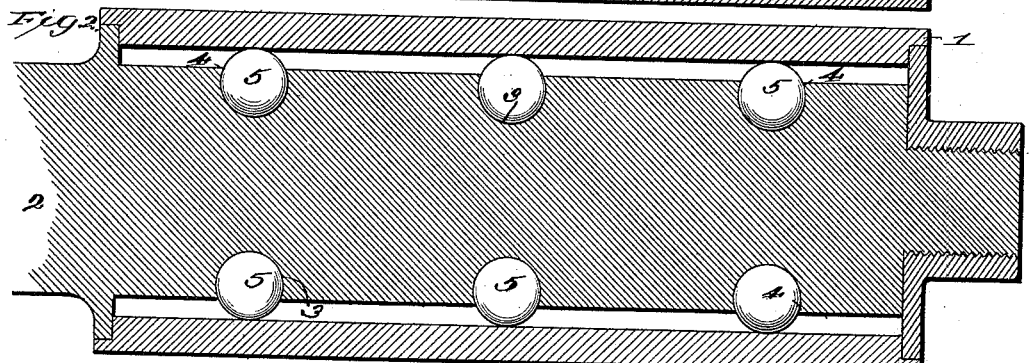
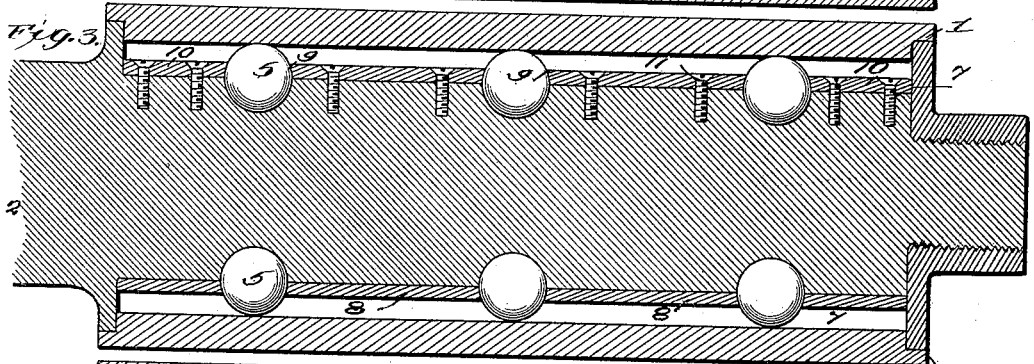
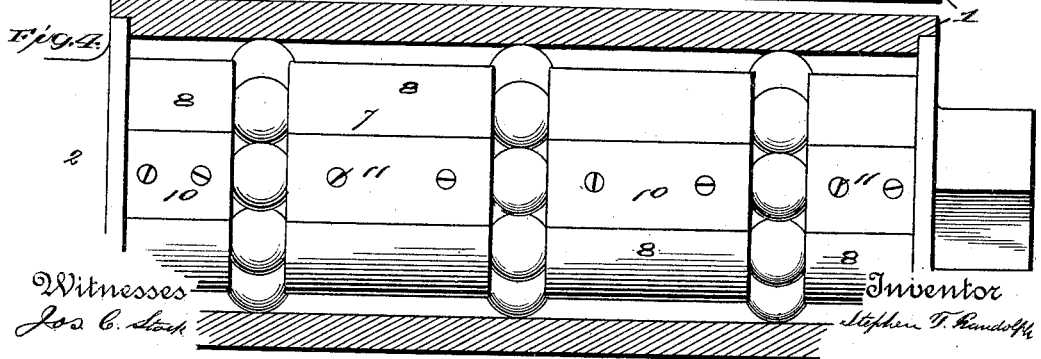

UNITED STATES PATENT OFFICE.

STEPHEN T. RANDOLPH, OF COVINGTON, INDIANA.

BALL-BEARING.

SPECIFICATION forming part of Letters Patent No. 606,241, dated June 28, 1898.

Application filed September 11, 1897. Serial No. 651,319. (No model.)

*To all whom it may concern:*

Be it known that I, STEPHEN T. RANDOLPH, a citizen of the United States of America, residing at Covington, in the county of Fountain and State of Indiana, have invented certain new and useful Improvements in Ball-Bearing Devices; and I do hereby declare the following to be a full, clear, and exact description of the invention, such as will enable others skilled in the art to which it appertains to make and use the same.

My invention relates to novel and useful improvements in journal-bearings; and it has for its object primarily to provide a bearing in which the friction will be reduced to a minimum.

A further object of the invention is to so construct the shaft that the balls will be prevented from falling therefrom when the shaft is removed from the bearing-box to be cleaned or for other purposes.

With these and other objects in view, which will become apparent in the course of the following description, all looking toward improving and simplifying devices of this character generally, my invention consists in the novel combination and arrangement of simple parts, that will be hereinafter fully described, and the points of novelty will be particularly pointed out in the appended claim.

With these ends in view I have devised the bearing illustrated in the accompanying drawings, in which—

Figure 1 represents a longitudinal sectional view of the bearing-box, the shaft and balls thereon being shown in elevation. Fig. 2 is a longitudinal sectional view taken centrally through the shaft and bearing-box. Fig. 3 is a longitudinal sectional view of a bearing-box and shaft, illustrating the modification of my invention; and Fig. 4 is a similar view of the bearing-box, the shaft and casing thereof being in elevation.

Referring to the drawings, the numeral 1 indicates a bearing-box, through which passes a shaft 2, provided with annular grooves 3, suitably spaced apart, said grooves having their edges beveled, as indicated by the numeral 4, and extending slightly above the centers of the balls 5 therein, which obviously will retain the balls in the grooves. At suitable points to these annular grooves the edges of said grooves are cut away, as indicated by the numeral 6, thus permitting the balls to be placed in the grooves.

Referring particularly to the modification illustrated in Figs. 3 and 4, it will be noted that the shaft 2 is surrounded by a casing 7, which is formed in sections 8, having their ends 9 beveled and extending slightly above the centers of the balls 5 in the annular recesses in the shaft 2. The numeral 10 indicates a series of movable sections which are secured to the shaft 2 by means of screws 11 or other convenient means, which sections are adapted to be removed to permit the balls to be placed in the grooves, and after said balls are so placed the sections are again secured to the casing, thus preventing the balls from being removed from the grooves.

From the foregoing description it will be noted that the shaft can be removed from the bearing-box for the purpose of cleaning or oiling the balls, there being no danger of the balls dropping from the shaft and becoming loose.

While I have shown and described a shaft in which a plurality of annular grooves are shown, it will be understood that where it is found desirable a single groove may be provided upon the shaft and the balls placed therein in the manner described. Minor changes and modifications involving mechanical skill may be made within the scope of this invention without in any way departing from the spirit thereof. I therefore do not desire to be understood as limiting myself to the precise structure shown in the drawings.

It will be understood that where my improved device is used in connection with buggies or wagons where the spindle tapers the balls will be increased in size from the point thereof toward the center of the axle.

Having thus described my invention, what I claim as new, and desire to secure by Letters Patent, is—

In a device of the character described, the combination, with a suitable bearing-box, of a shaft therein having annular grooves in its periphery, a casing surrounding said shaft and formed in sections having their edges beveled and extending slightly above the centers of the balls, whereby said balls are kept in the grooves, removable sections secured to the axle and having their edges conforming to the shape of the edges of the sections forming the casing, said removable sections being adapted to be removed to permit the balls to be placed in the annular grooves, substantially as described.

In testimony whereof I have signed this specification in the presence of two subscribing witnesses.

STEPHEN T. RANDOLPH.

Witnesses:
OLIVER P. LEWIS,
JAMES A. LINDLEY.